United States Patent
Urabe et al.

(12) 
(10) Patent No.: US 6,801,329 B1
(45) Date of Patent: Oct. 5, 2004

(54) DIGITAL COPYING MACHINE AND A DIGITAL COPYING MACHINE SYSTEM

(75) Inventors: Akio Urabe, Tokyo (JP); Hideyuki Watanabe, Tokyo (JP); Mitsuhisa Kanaya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/558,225

(22) Filed: Apr. 26, 2000

(30) Foreign Application Priority Data

Apr. 27, 1999 (JP) .............................. 11-119773
Apr. 12, 2000 (JP) ....................... 2000-110338

(51) Int. Cl.[7] .............................................. G06F 15/00
(52) U.S. Cl. ..................... 358/1.13; 358/1.15
(58) Field of Search ....................... 358/1.15, 1.16, 358/1.13, 1.14, 1.12, 1.1, 1.9

(56) References Cited

U.S. PATENT DOCUMENTS 6,426,800 B1 * 7/2002 Mizuno et al. ............ 358/1.15
6,449,054 B1 * 9/2002 Cox et al. .................. 358/1.15

FOREIGN PATENT DOCUMENTS

| JP | 9-251358 | 9/1997 |
| JP | 10-111773 | 4/1998 |
| JP | 10-112788 | 4/1998 |
| JP | 10-112789 | 4/1998 |

* cited by examiner

*Primary Examiner*—Twyler Lamb
(74) *Attorney, Agent, or Firm*—Oblon, Spivak, McClelland, Maier & Neustadt, P.C.

(57) ABSTRACT

The digital copying machine has a MBD that controls the overall device of the digital copying machine. The machine also has an LDU that controls a drawing laser with which an image is drawn onto a photoconductive drum, an SCU that controls a scanner, and a PCU that controls a control panel through which a user gives an instruction for an operation. These units are directly connected to the MBD by serial cables via their respective high performance serial interfaces.

35 Claims, 13 Drawing Sheets

DIGITAL COPYING MACHINE AND A DIGITAL COPYING MACHINE SYSTEM

FIELD OF THE INVENTION

The present invention relates to a digital copying machine and a digital copying machine system. More particularly, this invention relates to a digital copying machine and a digital copying machine system in which a high performance serial interface is used for an inner interface.

BACKGROUND OF THE INVENTION

The technology of a high performance serial interface has been coming into wide use in recent years. For example, employment of a high performance serial interface such as a USB (Universal Serial Bus) and a bus (henceforth, "IEEE 1394 bus") defined in the IEEE standard for a High Performance Serial Bus (IEEE 1394–1995) [1] is recommended or obliged in the standard on PC 98[2].

The IEEE 1394 bus supports up to 400 Mbps, and it is planed to be further speeded up to 800 Mbps or 1.6 Mbps. The IEEE 1394 bus prepares an isochronous transfer mode in addition to an asynchronous transfer mode. This isochronous transfer mode has a function of previously reserving a band width to enable insurance of a transfer time for that mode. In the same mode, communications can be made by means of the asynchronous transfer using the remaining part of the bandwidth although the transfer time is not insured.

The USB is a general purpose bus which has been defined for the purpose of connecting between a PC and peripheral devices by a unified type of interface so as to make its handling simpler. In this standard, the bus is connectable with maximum 127 units and also supports a hot swap of the units. There are two types of transfer speeds such as 12 Mbps (full speed) and 1.5 Mbps (low speed), and it is possible to allow these speeds to be present on the same bus. The USB employs four types of transfer method of isochronous transfer, interrupt transfer, bulk transfer, and control transfer.

Another feature of these high performance serial interfaces is such that the interface has a function (hot swap) of enabling attachment or detachment of a unit in the state where the device actuated by a user is being active. In order to realize this function, the interface supports a function to notify, at the time of attaching or detaching any unit, the unit of that effect.

Digitization and a multifunctional level of a copying machine have been progressing in recent years. Progress in its digitization means that information transmitted between the units forming the copying machine is digitized. On the other hand, increase in its multifunctional level means that the number of units to be connected to the machine is increasing.

FIG. 13 shows the outline of an example of connection between units forming a multifunctional machine based on a conventional digital copying machine. In the figure, as an essential unit, an LDU (laser-drawing control unit) 402 which controls a drawing laser is connected to a MBD (motherboard) 401 which controls the overall units by a cable. As another essential units, there are also an SCU (scanner control unit) 403 which controls a scanner, an IPU (image processing unit) 404 which performs digital image processing, and a PCU (panel control unit) 405 which controls a panel, which are also connected to the MBD 401 via their respective cables.

As option units, there are a sorter unit 406, a paper tray unit 407, an ADF (auto document feeder) unit 408, and a manual feeder unit 409, which are connected to the MBD 401 via their respective cables. As another option units, there are an auto page-turning unit 410, a charging unit 411, a BRU (bill recognition unit) 412, a filing unit 413, a FAX unit (facsimile unit) 414, a PRTU (printer unit) 415, a paper turning-over unit 416, and an OCR unit 417, which are also connected to the MBD 401 by their respective cables. The cables which are used for connections between the MBD 401 and each of the units 402 to 417 are based on different standards for the units, respectively.

When the digital copying machine is to be formed to a multifunctional machine, most of the units are the option units, thus, it is desirable to easily attach the units to the machine by a user.

However, the conventional digital copying machine has prepared a different type of interface for each essential unit or option unit, which does not allow the user to easily attach the units to the machine. Therefore, an expert, who knows well the configuration of the digital copying machine, is required to attach or detach the essential units or option units to or from the machine. Thus, the attachment or detachment of the units to or from the machine is not easily carried out.

Further, since a plurality of signal lines are used for connections between the MBD 401 and the LDU 402 and between the SCU 403 and the MBD 401 based on speedup of the copying machine and multi-valued image data, there are some inconveniences as follows.

When a high-speed signal is transmitted through a plurality of signal lines, in association with an increase in the number of lines, a difference between times, at which the signal arrives in each of the signal lines, becomes a more serious problem (problems such as racing or skew). Based on the transmission, there are such problems:

1) the transmission clock rate can not be increased so much, and
2) the signal line can not be made so long.

The above mentioned first problem becomes an urgent matter because the digital copying machine has recently been speeded up. Whereas the above mentioned second problem includes a matter to be solved especially between the SCU 403 and the MBD 401 because, currently, the digital multifunctional machine tends to separate the scanner from the engine part in order to reduce the area of a place where the machine is installed or increase the flexibility in the place for its installation.

SUMMARY OF THE INVENTION

The present invention has been achieved in order to solve the above problems. It is an object of this invention to provide a digital copying machine and a digital copying machine system which can construct a system with a higher degree of flexibility by using a high performance serial interface as an inner interface.

According to one aspect of this invention, a scanner control unit reads an image of a document, a drawing control unit draws an image onto an image carrier, and a main control unit controls the overall machine. Further, a high performance serial interface is used as an inner interface.

Further, the drawing control unit and the main control unit are connected to each other by a high performance serial interface.

Further, the scanner control unit and the main control unit are connected to each other by a high performance serial interface.

Further, the scanner control unit and the drawing control unit are connected to the main control unit by their respective high performance serial interfaces.

Further, an image processing unit is connected to the machine by a high performance serial interface.

Further, a panel control unit is connected to the machine by a high performance serial interface.

According to another aspect of this invention, a scanner control unit reads an image of a color document, a drawing control unit is provided for each color in order to draw an image onto a latent image carrier in each color, and a main control unit controls the overall machine. Further, a high performance serial interface is used as an inner interface, and the main control unit and the drawing control units, each of which is provided for each color, are connected by their respective high performance serial interfaces.

Further, an option unit is connected to the machine by a high performance serial interface.

Further, the option unit is at least one among a sorter unit, a paper tray unit, an ADF unit, a manual feeder unit, an auto page-turning unit, a charging unit, a bill recognition unit, an OCR unit, a remote diagnosis unit, a filing unit, a facsimile unit, a printer unit, a hard disk drive unit, a removal disk unit, and a paper turning-over unit.

Further, the option units are connected to the machine by the same type of high performance serial interfaces.

Further, any control unit other than the option units controls the high performance serial interfaces.

Further, there are an isochronous transfer mode and an asynchronous transfer mode as a data transfer mode. Image data is transferred in the isochronous transfer mode, whereas a command is transferred in the asynchronous transfer mode.

Further, an IEEE 1394 bus is used as a high performance serial interface.

Further, a USB is used as a high performance serial interface.

Further, the main control unit is determined as a bus manager for the high performance serial interfaces.

Further, the main control unit is determined as a controller for the high performance serial interfaces.

Further, the digital copying machine is connected to an external device via a high performance serial interface and a bridge.

According to still another aspect of this invention, at least two of the above explained digital copying machines are connected to each other by a bridge via the high performance serial interfaces of the machines, and the bridge is configured so as to allow at least the two digital copying machines, which are connected to each other by the bridge, to perform a parallel operation.

According to still another aspect of this invention, at least two of the above explained digital copying machines are connected to each other by a bridge via the high performance serial interfaces of the machines, and the bridge is configured so as to allow, when one of the digital copying machines in operation goes down due to a breakdown or a paper jam or the like, the digital data of the disabled digital copying machine to be transferred to the other digital copying machine that is also connected to the bridge.

Further, a high performance serial interface is used as an external interface for the bridge.

Other objects and features of this invention will become apparent from the following description with reference to the accompanying drawings.

DESCRIPTION OF THE PREFERRED EMBODIMENTS

Five preferred embodiments of the digital copying machine and the digital copying machine system according to the present invention are explained below with reference to the attached drawings.

Figure 1:
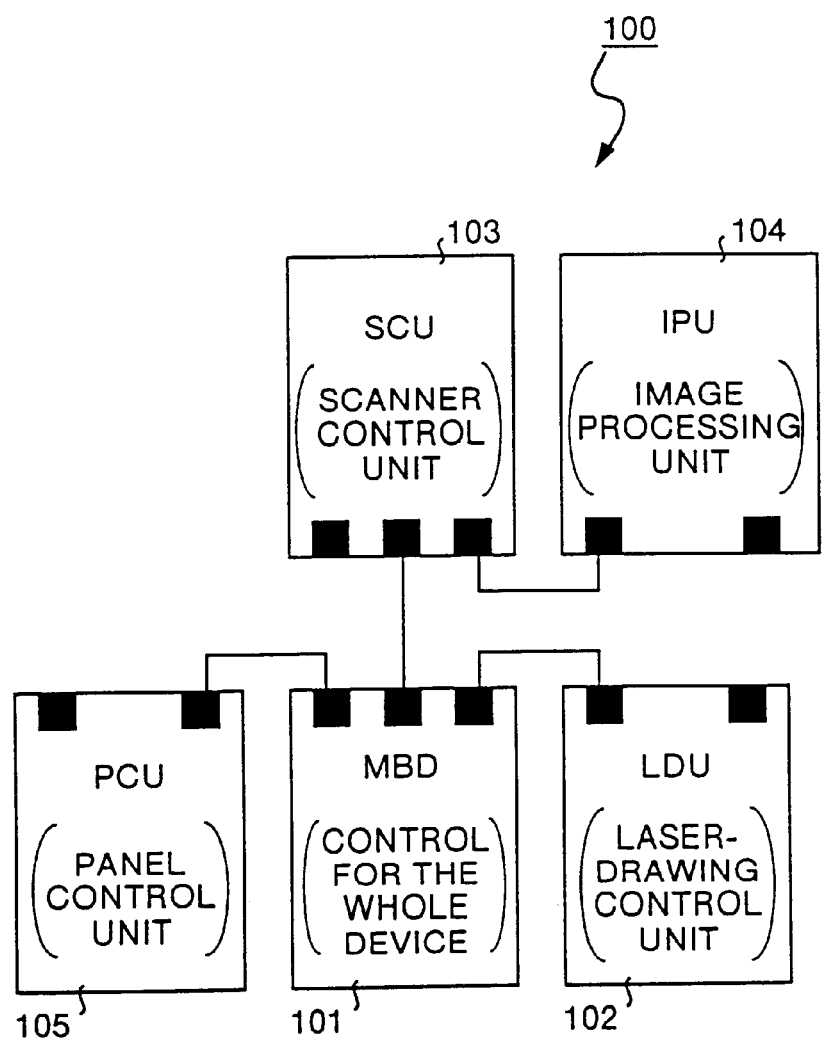
FIG. 1 shows a schematic configuration of a digital copying machine according to a first embodiment.

FIG. 1 shows a schematic configuration of a digital copying machine 100 according to a first embodiment. Referring to the digital copying machine shown in FIG. 1, the case, where an IEEE 1394 standard interface as a high performance serial interface is used as an inner interface, is explained below.

In FIG. 1, reference numeral 101 represents a MBD (motherboard) that controls the overall device of the digital copying machine 100. Reference numeral 102 represents an LDU (laser-drawing control unit) that controls a drawing laser with which an image is drawn onto a photoconductive drum. Reference numeral 103 represents an SCU (scanner control unit) that controls a scanner, 104 an IPU (image processing unit) that performs digital image processing, and 105 a PCU (panel control unit) that controls a control panel through which a user gives an instruction for an operation. Each of the units 101 to 105 has an IEEE 1394-compatible high performance serial interface.

As shown in FIG. 1, the LDU 102, the SCU 103, and the PCU 105 are directly connected to the MBD 101 by serial cables via their respective high performance serial interfaces. Further, the IPU 104 is directly connected to the SCU 103 by a serial cable via the high performance serial interfaces.

Although the case where the IEEE 1394 standard interface is used as a high performance serial interface has been explained, the present invention is not limited to this interface. Thus the USB may be used as a high performance serial interface.

Data transfer of the digital copying machine is explained below. The IEEE 1394 supports isochronous transfer and asynchronous transfer.

Isochronous transfer is a transfer method such that 200 Mbps, for example, out of 400 Mbps as a transfer speed of the serial interface can be used specifically to a communication path. Data transfer is ensured at any time because the path can be dedicated. That is, the same effect as that of direct connection can be obtained. In the digital copying machine according to the present invention, the isochronous transfer is used for data such as image data that requires strict timings.

Asynchronous transfer is realized by splitting data to be transferred to packets, detecting any available serial bus, and sending them when the bus is available. In this method, it is quite impossible to realize isochronism that data is surely received by a destination on certain time, but it is possible to insure that data can be received within a certain period of time. Therefore, this method is suitable for command transfer that does not require strict timings. In the digital copying machine according to the present invention, the asynchronous transfer is used for data such as a command that does not require strict timings.

Figure 2:
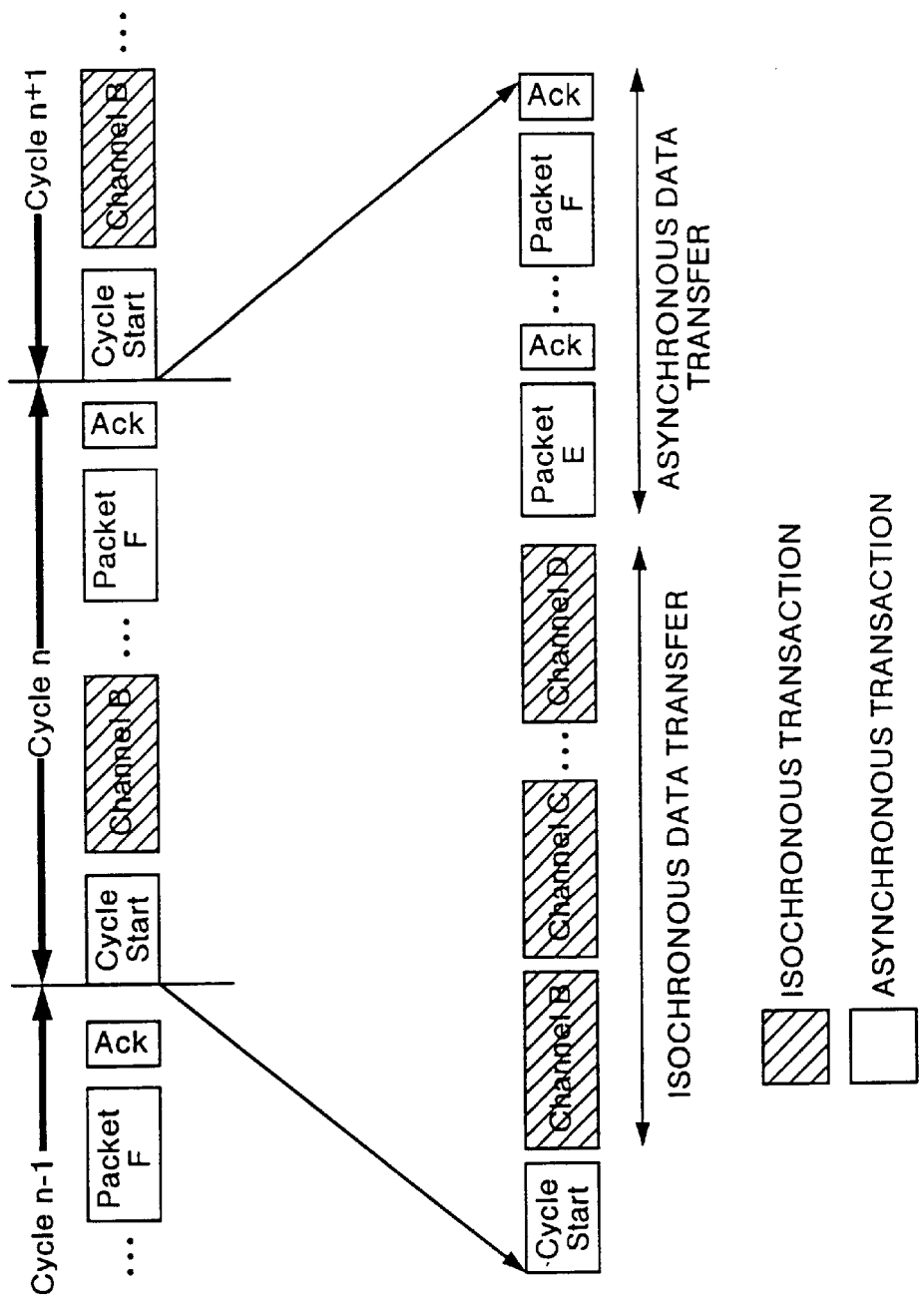
FIG. 2 shows timings of data transfer when data is transferred using the IEEE 1394 in the digital copying machine.

The data transfer timings when data is transferred using the IEEE 1394 in the digital copying machine are explained below with reference to FIG. 2. FIG. 2 shows the timings of data transfer when data is transferred using the IEEE 1394 in the digital copying machine. In the figure, the horizontal axis represents time, the diagonally shaded parts represent data which is transferred by means of isochronous transfer, and the blank parts represent data which is transferred by means of asynchronous transfer.

In FIG. 2, one cycle takes 125 microseconds, and each cycle starts with a specific packet called Cycle Start. A plurality of data units to be sent in the isochronous transfer mode can concurrently exist on the IEEE 1394, and each of the data units is referred to as Channel. At first, the time is taken for isochronous transfer, and then asynchronous transfer starts and is continued until the next Cycle Start appears. Since the time is first taken up for isochronous transfer, it is insured that a predetermined amount of data can be sent every 125 microseconds, which is the characteristic of the isochronous transfer mode. By utilizing this characteristic, the isochronous transfer mode is used for the case where a predetermined amount of data is unfailingly transferred within a certain period of time such as the case where image data is transferred from the IPU 104 to the LDU 102. If a delay occurs in transfer of image data to the LDU 102, for example, the data can not correctly be printed on paper.

Whereas in the asynchronous transfer mode, each node determines, after the isochronous transfer is finished, whether data transfer is now possible. When data transfer is possible, the data is transferred. In the asynchronous transfer mode, data transfer may not be completed within a certain cycle. Namely, in the asynchronous transfer mode, it is not possibly insured that a predetermined amount of data can surely be transferred within a certain period of time. However, when the serial interface is sufficiently fast, data can be transferred if it is allowed to take some time for data transfer. Thus, the asynchronous transfer mode is used for sending data like a command, that does not require a severe condition on a time basis, to each function unit. Based on this feature, the serial interface can efficiently be utilized.

Figure 3:
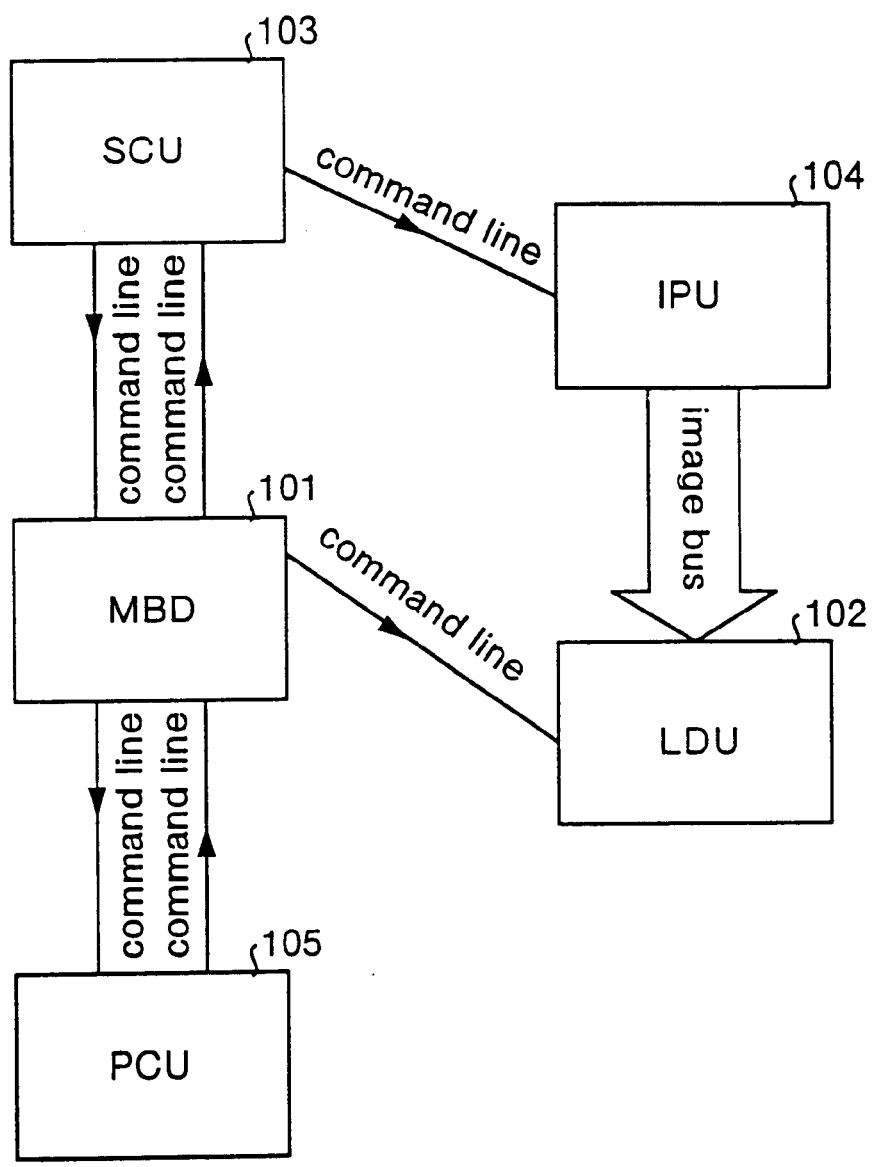
FIG. 3 shows an example of a configuration when the conventional interfaces are used for connection between the units in the digital copying machine shown in FIG. 1.

FIG. 3 shows an example of a configuration when the conventional interfaces are used for connection between the units in the digital copying machine shown in FIG. 1. As shown in FIG. 3, in the conventional system, the SCU 103 and the MBD 101 are connected to each other by command lines, which are signal lines dedicated for commands, in two directions and so are the MBD 101 and the PCU 105. The SCU 103 and the IPU 104 are connected by a command line in one direction and so are the MBD 101 and the LDU 102. The IPU 104 and the LDU 102 are connected to each other by a dedicated image bus. Namely, based on the conventional technology, a bus dedicated to images is utilized for image data, a signal line dedicated to a command is utilized for a command. A parallel interface has been used for image data because of the large amount of data, whereas a low-speed serial interface such as RS232C has been used for a command. Each of the bus dedicated to images and the signal line dedicated to a command is a peer-to-peer interface. Therefore, it is required to reconnect between a pair of units each time a signal to be sent from one to the other, thus, the number of signal lines is largely increased in association with an increase in units such as an MFP.

On the contrary, the present invention uses a high performance serial interface. Therefore, as shown in FIG. 1, when five units are connected, only four lines of serial cable are required. When there are nine units to be connected (see FIG. 8), only eight lines of serial cable are required, which is such an advantage that the number of serial cables is increased only by the number of increased units.

Figure 4:
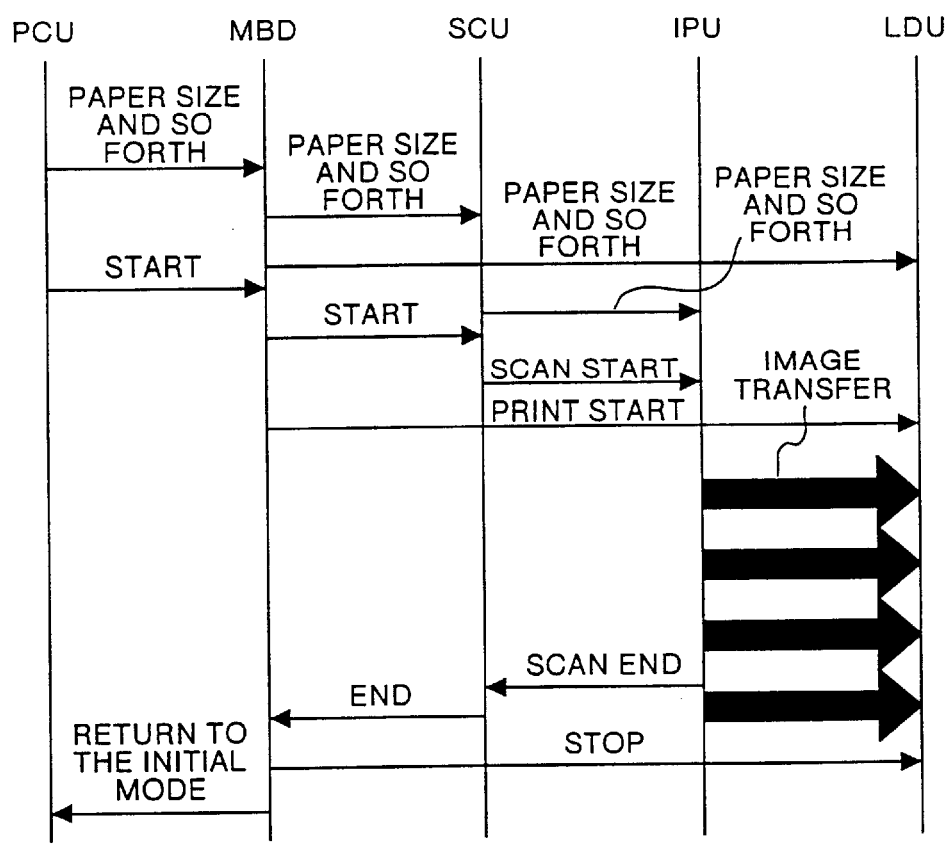
FIG. 4 shows an example of a sequence of commands and image data when copying is performed by the digital copying machine having the configuration in FIG. 1.

FIG. 4 shows an example of a sequence of commands and image data when copying is performed by the digital copying machine having the configuration in FIG. 1. In the figure, the PCU 105 transfers a command for Paper size or the like to the MBD 101. The MBD 101 transfers the command for Paper size to the SCU 103 and the LDU 102. The SCU 103 then transfers the command for Paper size to the IPU 104.

The PCU 105 transfers a command for Start to the MBD 101. The MBD 101 transfers the command for Start to the SCU 103, and the SCU 103 then transfers the command for Scan Start to the IPU 104. The MBD 101 also transfers a command for Print Start to the LDU 102. The IPU 104 starts scanning and transfers the scanned image data to the LDU 102. When scanning is finished, the IPU 104 transfers a command indicating Scan End to the SCU 103, and the SCU 103 transfers a command indicating End to the MBD 101. After the reception of this command, the MBD 101 transfers a command for Stop to the LDU 102, and then transfers a command for returning the processing to the initial mode to the PCU 105.

Image data (isochronous data) to be transferred in the isochronous transfer mode and a command (asynchronous data) to be transferred in the asynchronous transfer mode are present on the same serial interface. Therefore, it is required to separate the image data from the command.

Figure 5:
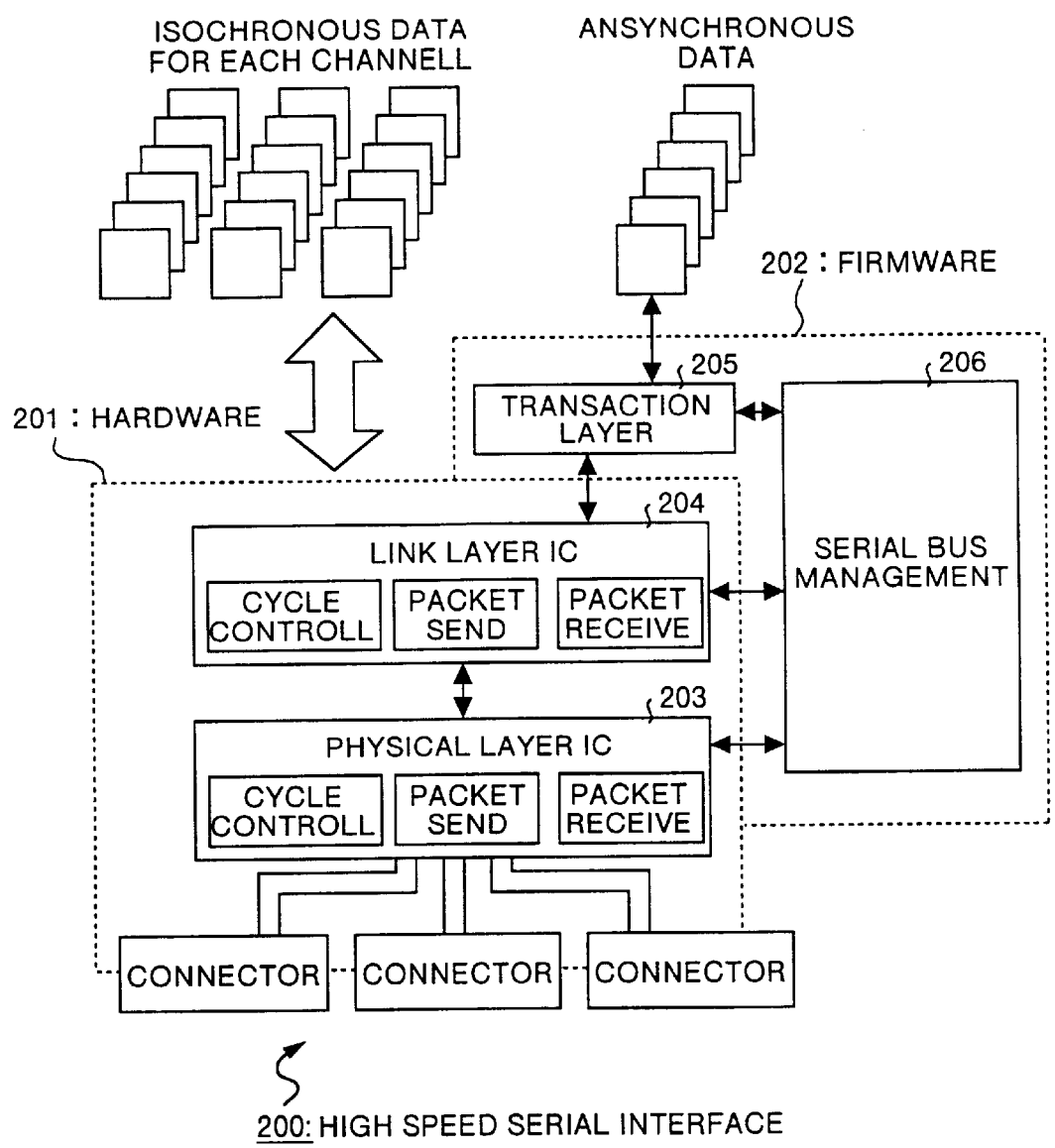
FIG. 5 shows a configuration of a high performance serial interface for each unit in FIG. 1.

FIG. 5 shows an example of a configuration of a high performance serial interface 200 for each unit. More specifically, FIG. 5 shows an example of a configuration of the high performance serial interface when the IEEE 1394 is used. As shown in FIG. 5, the high performance serial interface (I/F) 200 consists of hardware 201 and firmware 202. The hardware 201 performs encoding/decoding and arbitration. Further, the high performance serial interface 200 has a physical layer (physical layer IC) 203 which functions as a media interface and a link layer (link layer IC) 204 which performs cycle control, and transmission and reception of packets. Connectors are connected to the physical layer (physical layer IC) 203. The firmware 202 consists of a transaction layer 205 and a serial bus management 206.

The IEEE 1394 supports isochronous transfer and asynchronous transfer as mentioned above. The physical layer (physical layer IC) 203 separates the isochronous data from the asynchronous data by comparing a time gap between the isochronous data to a time gap between the asynchronous data. Referring to the isochronous data, the packets to be transacted are lined for each channel in the link layer (link layer IC) 204. While, referring to the asynchronous data, a line of queue is formed in the transaction layer 205, where the packets to be transacted in the link layer (link layer IC) 204 are lined up.

Figure 6:
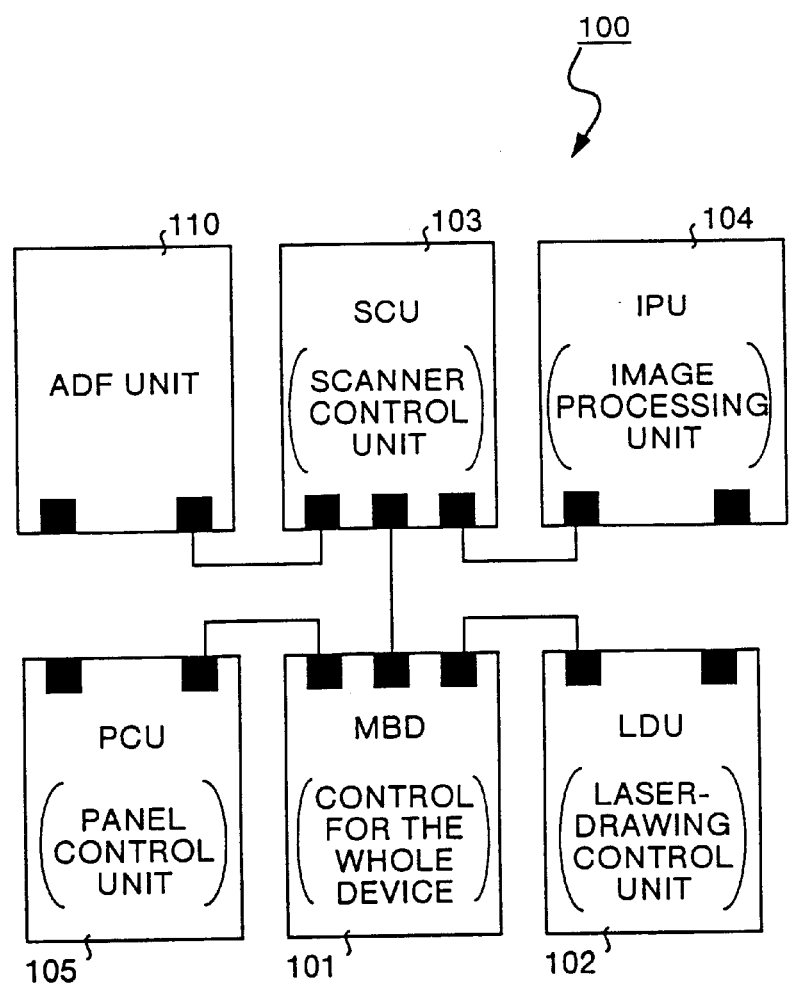
FIG. 6 shows a case where an ADF unit is connected to the digital copying machine in FIG. 1.

A method of setting a Node ID of each unit when a new unit is connected to the digital copying machine in FIG. 1 is explained below. FIG. 6 shows a case where an ADF unit 110 is connected to the digital copying machine in FIG. 1. More specifically, FIG. 6 shows a case where the ADF unit 110 is newly connected to the SCU 103.

Figure 7:
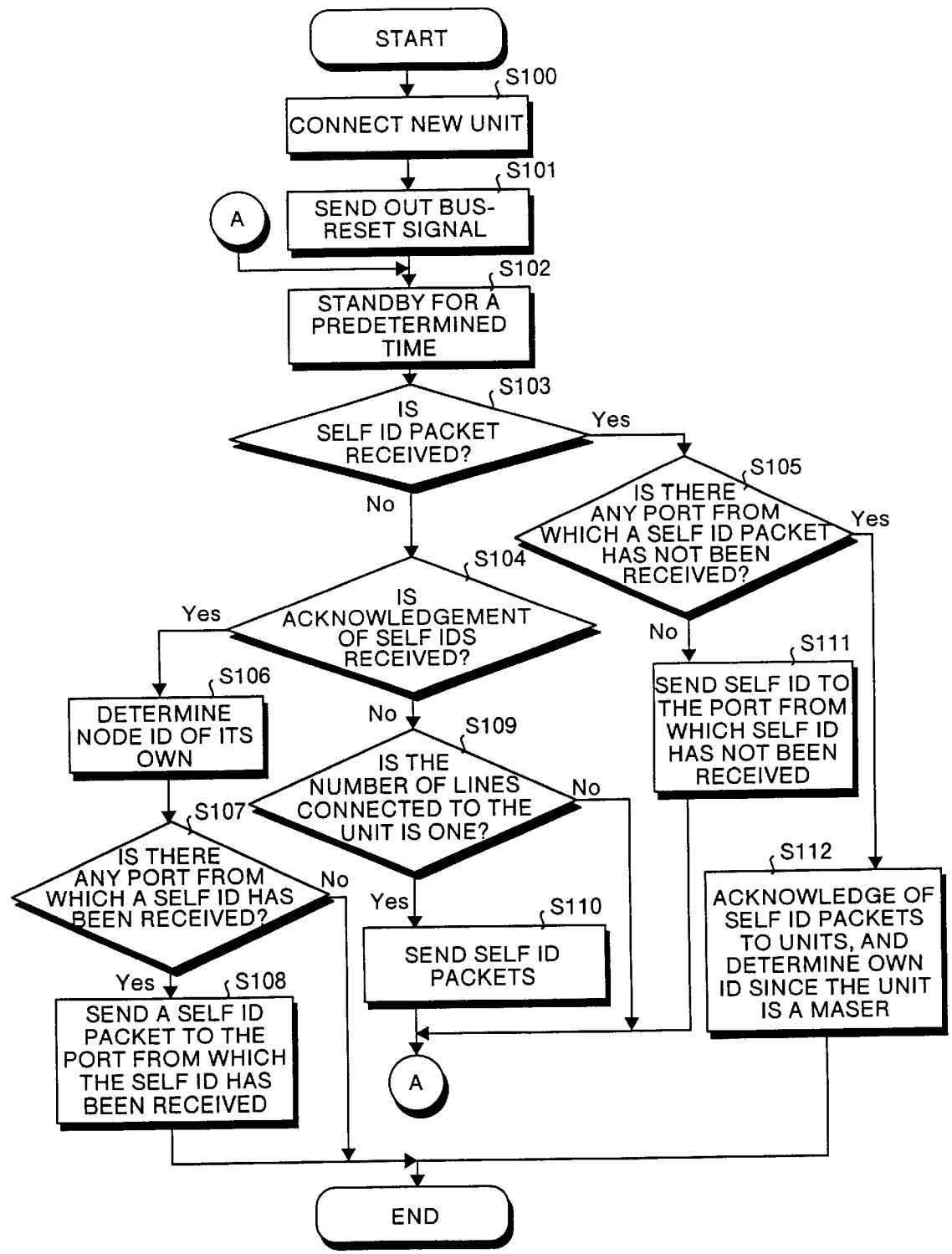
FIG. 7 shows a flow chart of a method of deciding a Node ID for each unit when a new unit is connected to the digital copying machine in FIG. 1.

The case where the ADF unit 110, that has been turned ON, is connected to the SCU 103 is explained below. FIG. 7 shows a flow chart of a method of deciding a Node ID for each unit when a new unit is connected to the machine.

In FIG. 7, when a new unit (ADF unit) is connected (step S100), the new unit sends out a bus reset signal to generate bus reset (step S101). A unit as a master is then held in standby for a predetermined period of time (step S102), and determines whether Self ID (Node ID) packets sent from the units have arrived (step S103). When the Self ID packets have been received, the master unit determines whether there is any port (unit) from which the packet has not been received (step S105). When the Self ID packets from all the ports have been received, the master unit sends acknowledgements of the Self ID packets to the ports, and determines its own Node ID (step S112), and ends the flow. While at step S105, the unit as a master sends out a Self ID, when there is any port from which the Self ID packet has not been received, to the port (step S111), and returns to the processing at step S102.

On the other hand, at step S103, when the Self ID packets have not been received, the unit as a master proceeds to step S104, and determines whether acknowledgments of the Self IDs have been received. When the acknowledgments of the Self IDs have been received, the master unit determines its own Node ID (step S106). The unit as a master determines whether there is any port from which the Self ID has been received (step S107). When there is no port from which the Self ID has been received, the master unit ends the flow. On the other hand, when there is any port from which the Self ID has been received, the master unit sends out a Self ID packet to the port (step S108), and ends the flow.

At step S104, when the acknowledgments of the Self IDs have not been received, the unit as a master determines whether the number of lines connected to the unit is one line (step S109). When the number of lines connected to the unit is not one line, the unit returns to step S102. When the number of lines connected to the unit is one line, the unit as a master proceeds to step S110, sends out Self ID packets to ports, and returns to step S102.

Based on this flow, each unit can determine its own Node ID, and the Node ID is once determined, units can establish communications by using their respective Node IDs.

The bus manager for the digital copying machine is explained below. In the IEEE 1394 standard, only one bus manager is allowed to be provided for the overall units connected to the machine. Therefore, which unit becomes a bus manager is determined based on the following processing: any unit which has a function as a bus manager writes in a configuration register "as quickly as possible" and a first unit, which is successful to write, becomes a bus manager. As a unit becoming a bus manager, any control unit (MBD 101, LDU 102, SCU 103, or PCU 105) other than the option units is preferable, and it is more preferable that the MBD 101 becomes a bus manager.

A method of allowing the MBD 101 to surely be a bus manager includes a method of mounting a bus-manager function only on the MBD 101, and a method of fist powering the MBD 101 ON and then powering the remaining units ON after the MBD 101 becomes a bus manager. The former method is usually employed.

In the USB standard, a USB controller should exist only one over the whole connected units. Which unit out of the units is determined as a controller is defined at the time of manufacturing. As a unit which becomes a USB controller, any control unit (MBD 101, LDU 102, SCU 103, or PCU 105) other than the option units is preferable, and it is more preferable that the MBD 101 becomes a controller.

In the first embodiment (see FIG. 1), a case has been explained in which the high performance serial interfaces are used for direct connection between the LDU 102 and the MBD 101 and between the SCU 103 and the MBD 101 in the digital copying machine based on a one-drum system. Whereas in the second embodiment explained below, a digital copying machine based on a four-drum system is explained.

Figure 8:
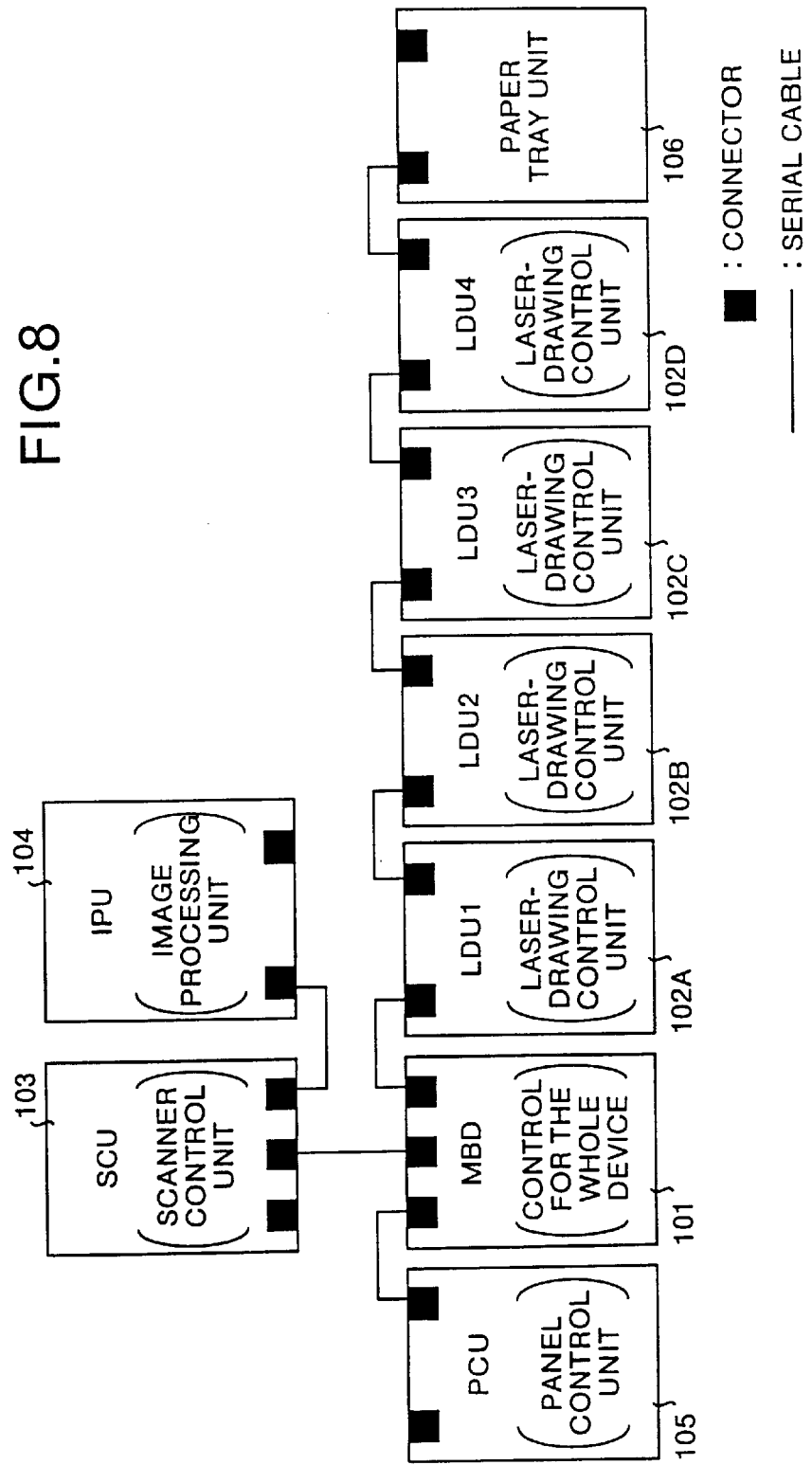
FIG. 8 shows a schematic configuration of a digital copying machine according to a second embodiment.

FIG. 8 shows a schematic configuration of a digital copying machine according to the second embodiment. The digital copying machine shown in FIG. 8 represents a configuration in which the number of units in the four-drum digital copying machine is kept to a minimum. Referring to the digital copying machine shown in FIG. 8, the case where the IEEE 1394 standard interface as a high performance serial interface is used as an inner interface is explained below.

In FIG. 8, reference numeral 101 represents an MBD (motherboard) that controls the overall machine. Reference numeral 102A represents an LDU 1 (laser-drawing control unit) that controls a drawing laser (for Bk) with which an image is drawn onto a photoconductive drum, and 102B an LDU 2 (laser-drawing control unit) that controls a drawing laser (for C) with which an image is drawn onto the photoconductive drum. Reference numeral 102C represents an LDU 3 (laser-drawing control unit) that controls a drawing laser (for M) with which an image is drawn onto the photoconductive drum, and 102D an LDU 4 (laser-drawing control unit) that controls a drawing laser (for Y) with which an image is drawn onto the photoconductive drum. Reference numeral 103 represents an SCU (scanner control unit) that controls a scanner, 104 an IPU (image processing unit) that performs digital image processing, 105 a PCU (panel control unit) that controls a control panel through which a user gives an instruction for an operation, and 106 a paper tray unit that is one of option units. Each of the units 101 to 105 has an IEEE 1394-compatible high performance serial interface. The configuration of the high performance serial interface is the same as that of FIG. 5 (first embodiment), therefore, explanation of the configuration is omitted.

As shown in FIG. 8, the SCU 103, the PCU 105, and the LDU 1 (for Bk) 102A are directly connected to the MBD 101 by serial cables via the high performance serial interfaces. The IPU 104 and the SCU 103 are directly connected to each other by a serial cable via the high performance serial interfaces. The LDU 1 (for Bk) 102A and the LDU 2 (for C) 102B are directly connected to each other by a serial cable via each high performance serial interface, and so are the LDU 2 (for C) 102B and the LDU 3 (for M) 102C, the LDU 3 (for M) 102C and the LDU 4 (for Y) 102D, and the LDU 4 (for Y) 102D and the paper tray unit 106, respectively.

As explained above, instead of direct connection between the MBD 101 and each of the LDU 1 to LDU 4, each connection is made between the MBD 101 and the LDU 1 (for Bk) 102A, the LDU 1 (for Bk) 102A and the LDU 2 (for C) 102B, the LDU 2 (for C) 102B and the LDU 3 (for M) 102C, and the LDU 3 (for M) 102C and the LDU 4 (for Y) 102D. Therefore, each cable can be made shorter. Further, these connections are effected based on a bus connection on the whole. Thus, in order to surely transmit information from the MBD 101 to each of the LDU 102A to the LDU 102D, the isochronous transfer is used so as to ensure a band through which the information can surely be transmitted to each of the LDU 102A to the LDU 102D.

Although, in the second embodiment, the case where the IEEE 1394 standard interface is used as a high performance serial interface has been explained, the present invention is not limited to this interface. Thus the USB may be used as a high performance serial interface.

Figure 9:
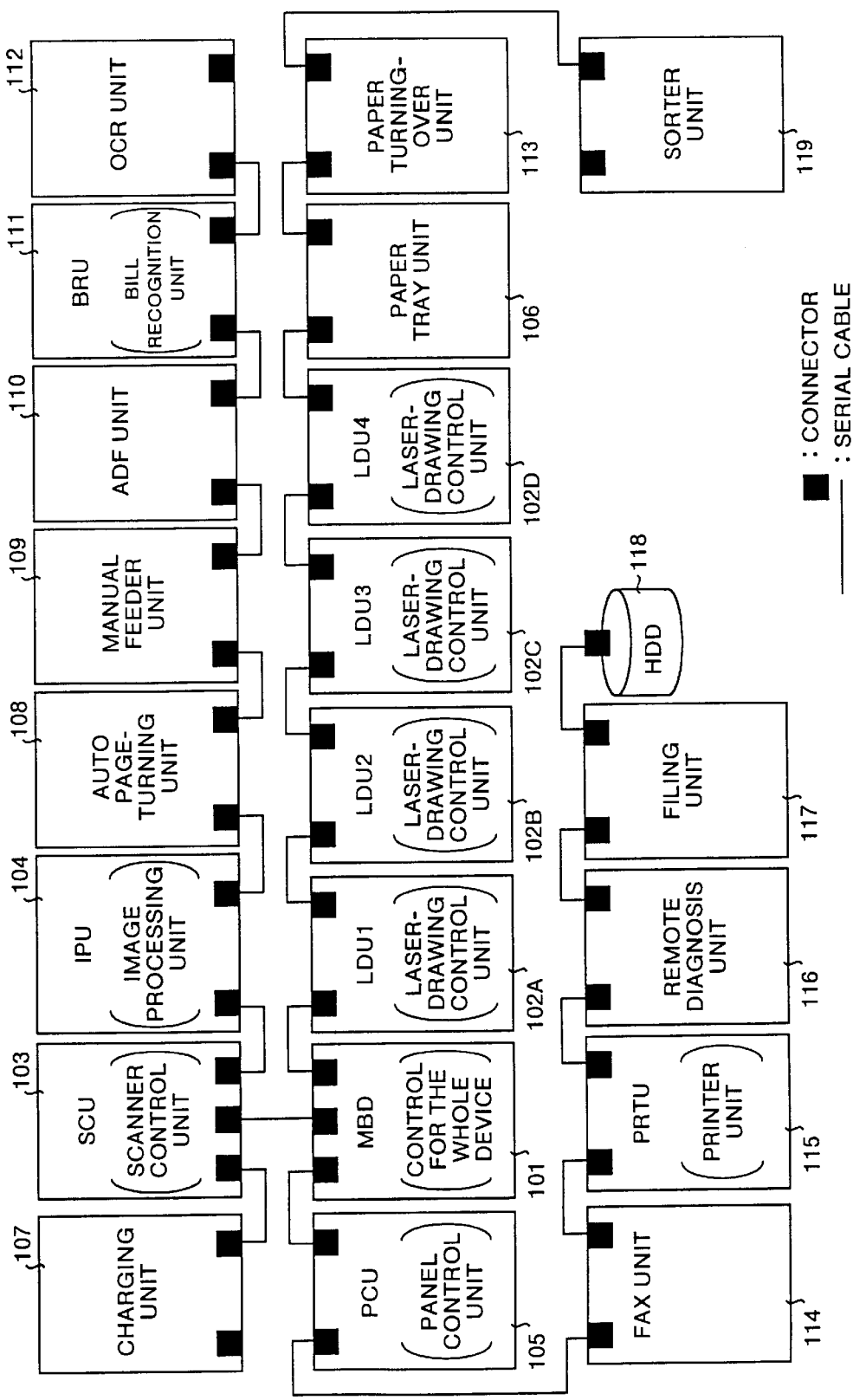
FIG. 9 shows a schematic configuration of a digital copying machine according to a third embodiment.

FIG. 9 shows a schematic configuration of a digital copying machine according to a third embodiment. The digital copying machine shown in FIG. 9 represents a configuration in which option units 107 to 119 are connected to the four-drum digital copying machine (see FIG. 8) according to the second embodiment. Referring to the digital copying machine shown in FIG. 9, the case where the IEEE 1394 standard interface as a high performance serial interface is used as an inner interface is explained below.

In FIG. 9, reference numeral 101 represents an MBD (motherboard) that controls the overall machine. Reference numeral 102A represents an LDU 1 (laser-drawing control unit) that controls a drawing laser (for Bk) with which an image is drawn onto a photoconductive drum, and 102B an LDU 2 (laser-drawing control unit) that controls a drawing laser (for C) with which an image is drawn onto the photoconductive drum. Reference numeral 102C represents an LDU 3 (laser-drawing control unit) that controls a drawing laser (for M) with which an image is drawn onto the photoconductive drum, and 102D an LDU 4 (laser-drawing control unit) that controls a drawing laser (for Y) with which an image is drawn onto the photoconductive drum. Reference numeral 103 represents an SCU (scanner control unit) that controls a scanner, 104 an IPU (image processing unit) that performs digital image processing, and 105 a PCU (panel control unit) that controls a control panel through which a user gives an instruction for an operation.

Figure 13:
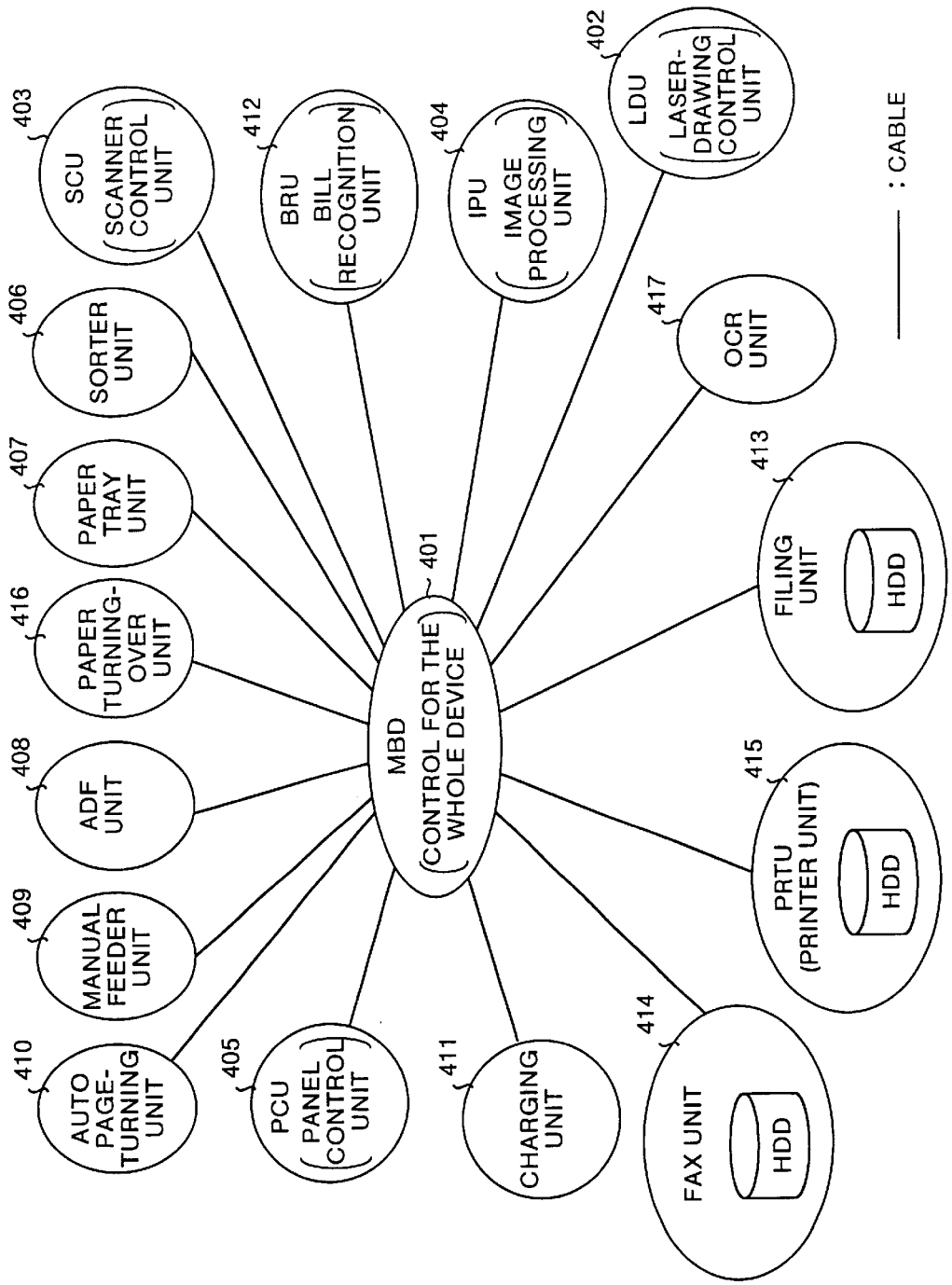
FIG. 13 shows a schematic configuration of the conventional digital copying machine.

In FIG. 9, reference numerals 106 to 119 represent option units, and more specifically, reference numeral 106 represents a paper tray unit, 107 a charging unit, 108 an auto page-turning unit, and 109 a manual feeder unit. Further, reference numeral 110 represents an ADF (auto document feeder) unit, 111 a BRU (bill recognition unit), 112 an OCR unit, and 113 a paper turning-over unit. Reference numeral 114 represents a FAX unit, 115 a PRTU (printer unit), 116 a remote diagnosis unit, 117 a filing unit, 118 a hard disk drive unit (HDDU), and 119 a sorter unit. Although the hard disk drive unit is used in FIG. 9, rewritable media such as a CD and a DVD may be used. Conventionally (see FIG. 13), a plurality of recording drive units (HDD) are prepared for the FAX unit 414, the printer unit 415, and the filing unit 413, respectively. However, by employing the high performance serial interface as an inner interface for the digital copying machine, the need for a plurality of recording drivers is eliminated.

Each of the units 101 to 119 has an IEEE 1394-compatible high performance serial interface. The configuration of the high performance serial interface is the same as that of FIG. 5 (first embodiment), therefore, explanation of the configuration is omitted.

As shown in FIG. 9, the SCU 103, the PCU 105, and the LDU 1 (for Bk) 102A are directly connected to the MBD 101 by cables 250 via the high performance serial interfaces. The IPU 104 and the SCU 103 are directly connected to each other by a cable via the high performance serial interfaces. The LDU 1 (for Bk) 102A and the LDU 2 (for C) 102B are directly connected to each other by a cable via the high performance serial interfaces, and so are the LDU 2 (for C) 102B and the LDU 3 (for M) 102C, the LDU 3 (for M) 102C and the LDU 4 (for Y) 102D, and the LDU 4 (for Y) 102D and the paper tray unit 106, respectively.

The charging unit 107 and the SCU 103 are directly connected to each other by a serial cable via the high performance serial interfaces, and so are the auto page-turning unit 108 and the manual feeder unit 109, the manual feeder unit 109 and the ADF unit 110, the BRU 111 and the OCR unit 112, and the paper tray unit 106 and the paper turning-over unit 113. Further, the paper turning-over unit 113 and the sorter unit 119 are directly connected to each other by a serial cable via the high performance serial interfaces, and so are the PCU 105 and the FAX unit 114, the FAX unit 114 and the PRTU 115, the PRTU 115 and the remote diagnosis unit 116, the remote diagnosis unit 116 and the filing unit 117, and the filing unit 117 and the HDD 118.

The option units are not limited to the units 106 to 119, thus any other option units may be used. At least one out of the units 106 to 119 is used by being connected to the machine.

Although, in the third embodiment, the case where the IEEE 1394 standard interface is used as a high performance serial interface has been explained, the present invention is not limited to this interface. Thus the USB may be used as a high performance serial interface.

Figure 10:
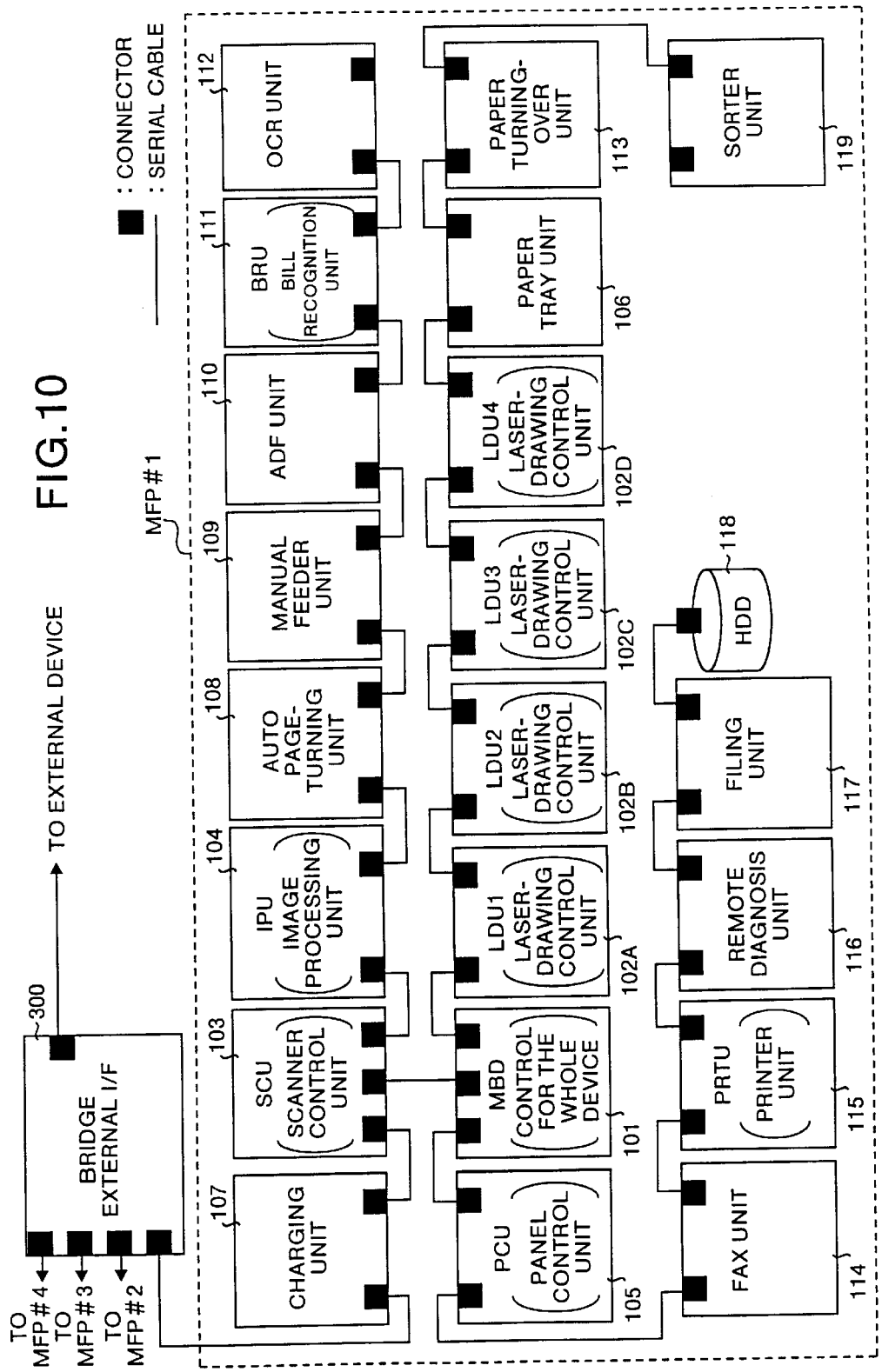
FIG. 10 shows a schematic configuration of a digital copying machine system according to a fourth embodiment.

FIG. 10 shows a schematic configuration of a digital copying machine system according to a fourth embodiment. Referring to the digital copying machine shown in FIG. 10, the case where the IEEE 1394 standard interface as a high performance serial interface is used as an inner interface is explained below.

FIG. 10 shows how four digital copying machines (MFP#1, MFP#2, MFP#3, and MFP#4) and an external device are connected via a bridge external I/F 300. Each of the digital copying machines (MFP#1, MFP#2, MFP#3, and MFP#4) may be configured as that shown in the third embodiment (FIG. 9).

Figure 11:
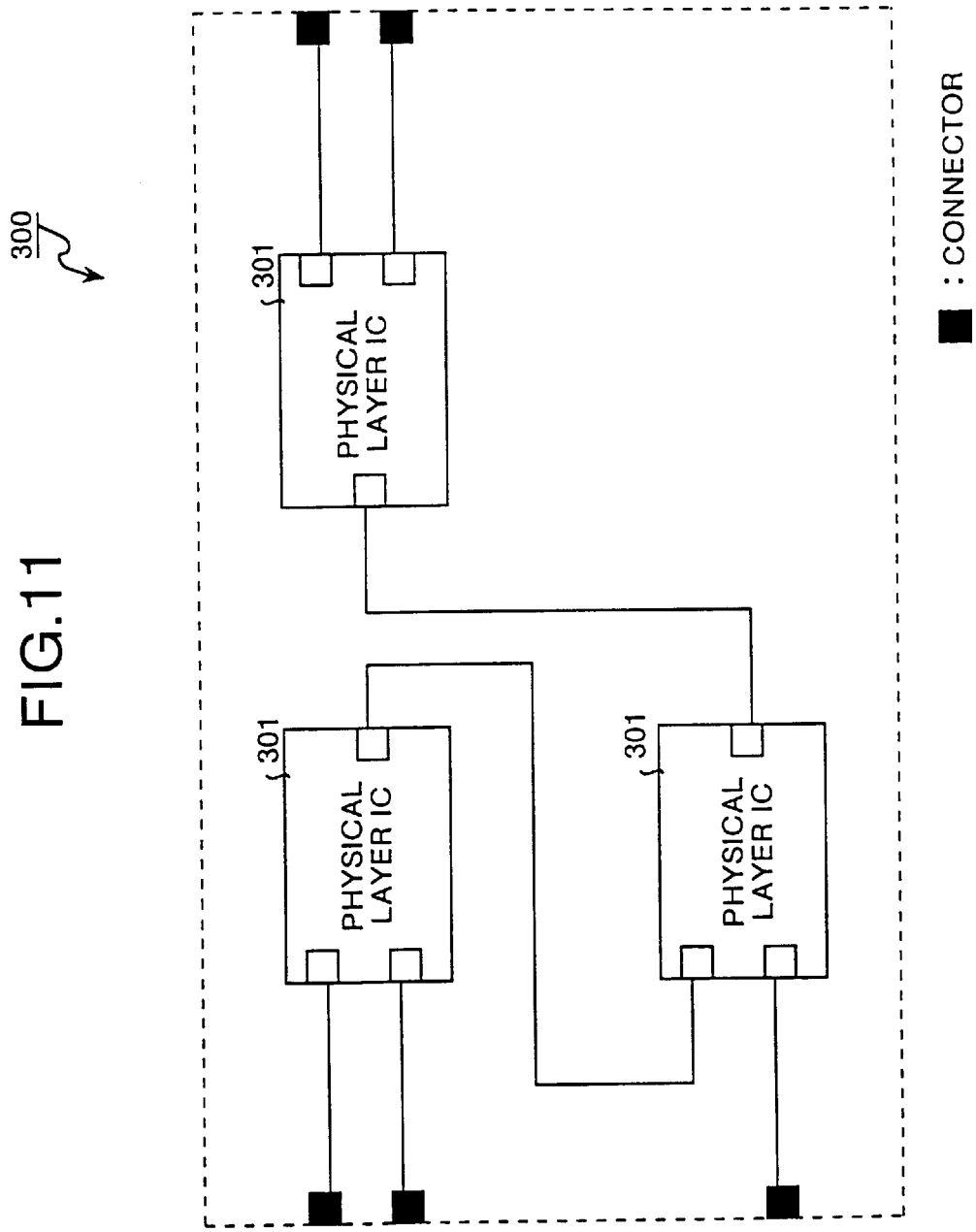
FIG. 11 shows a schematic configuration of the bridge external I/F in FIG. 1.

FIG. 11 shows a schematic configuration of the bridge external I/F 300. The bridge external I/F 300 has three physical layer ICs 301 and five connectors as shown in FIG. 11. The three physical layer ICs 301 are serially connected to each other, thus data is communicable between each of the digital copying machines (MFP#1, MFP#2, MFP#3, and MFP#4) connected to one of the connectors and the external device via the physical layer ICs.

Based on the configuration, the digital data which is being copied by the digital copying machine MFP#1 can be transferred to another digital copying machine (MFP#2, MFP#3, and MFP#4) connected to the bridge external I/F 300. Therefore, it is possible to perform parallel copying by operating the digital copying machines MFP#2, MFP#3, and MFP#4 concurrently with the digital copying machine MFP#1. In addition to the copying operation, the digital copying machines MFPs #1, 2, 3, and 4 can concurrently print based on an instruction sent from the external device connected to the bridge external I/F 300.

When one of the digital copying machines goes down during operation caused by a paper jam, a shortage of paper, a supply of toner, or a breakdown, the bridge external I/F 300 grasps the internal situation of the MFP by the remote diagnosis unit in the digital copying machine, and can allocate the job (copy job or print job) to any of available digital copying machines that are connected to the bridge external I/F 300.

When the high performance serial interface is used for the bridge external I/F 300, the job itself can also utilize the function of Plug & Play. In the fourth embodiment, although the case where the IEEE 1394 standard interface is used as a high performance serial interface has been explained, the present invention is not limited to this interface. Thus the USB may be used as a high performance serial interface.

Figure 12:
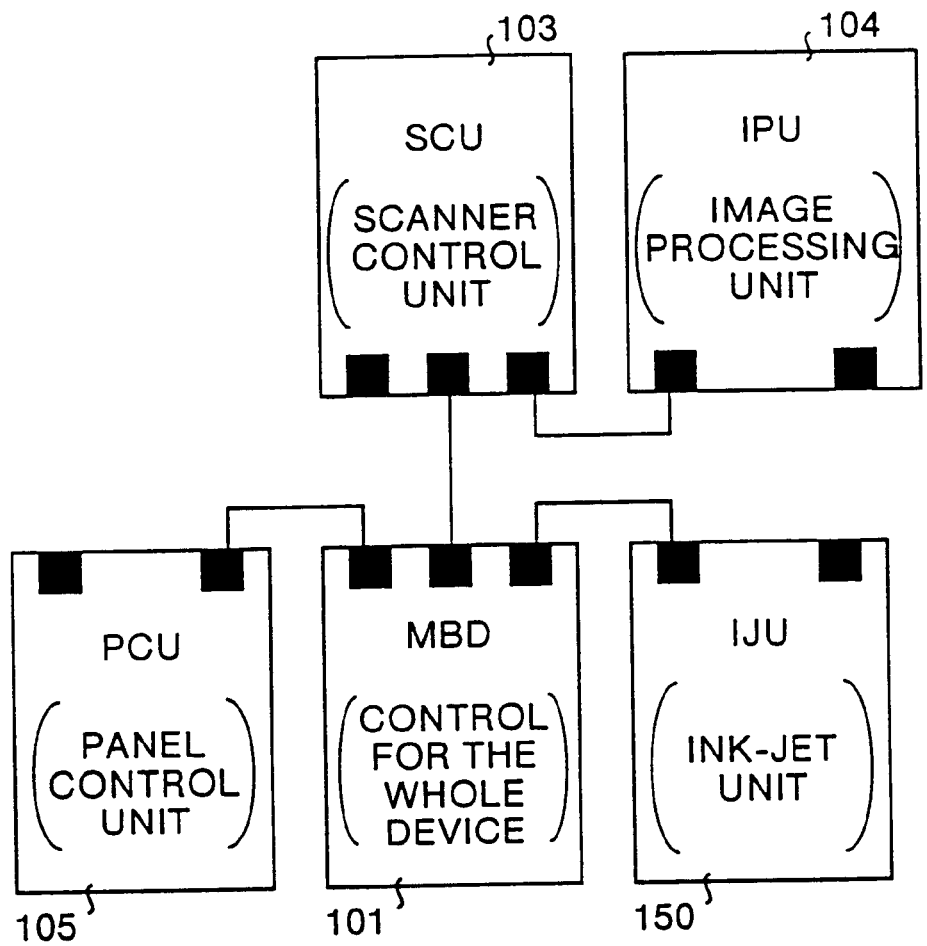
FIG. 12 shows a schematic configuration of a digital copying machine according to a fifth embodiment.

FIG. 12 shows a schematic configuration of a digital copying machine according to a fifth embodiment. In the first embodiment to the fourth embodiment, the electrophotographic digital copying machine is explained. However, this invention is applicable also to an ink-jet digital copying machine, and in the fifth embodiment, the ink-jet digital copying machine is explained. Referring to the digital copying machine shown in FIG. 12, the case where the IEEE 1394 standard interface as a high performance serial interface is used as an inner interface is explained below.

In FIG. 12, reference numeral 101 represents an MBD (motherboard) that controls the overall device of the digital copying machine. Reference numeral 150 represents an IJU (ink-jet unit) that jets ink corresponding to an image onto paper. Reference numeral 103 represents an SCU (scanner control unit) that controls a scanner, 104 an IPU (image processing unit) that performs digital image processing, and 105 a PCU (panel control unit) that controls a control panel through which a user gives an instruction for an operation. Each of the units has an IEEE 1394-compatible high performance serial interface. The configuration of the high performance serial interface is the same as that of FIG. 5 (first embodiment), therefore, explanation of the configuration is omitted.

As shown in FIG. 12, the IJU 150, the SCU 103, and the PCU 105 are directly connected to the MBD 101 by serial cables via their respective high performance serial interfaces. The IPU 104 is directly connected to the SCU 103 by a serial cable via the high performance serial interfaces.

Although the case where the IEEE 1394 standard interface is used as a high performance serial interface has been explained, the present invention is not limited to this interface. Thus the USB may be used as a high performance serial interface.

As explained in the first embodiment to the fifth embodiment, the digital copying machine according to this invention is designed to use a high performance serial interface as an inner interface. Therefore, in regard to performance, cost, maintenance, flexibility, and safety, the following effects can be achieved.

Performance: referring to the IEEE 1394 bus, for example, data transfer is possible at a speed of 400 Mbps under the current standard, and this speed is higher as compared to that of a parallel interface such as a Centronics interface and a SCSI. Further, standardization for the speed of 800 Mbps, 1.6 Mbps, and other than these is currently coming on. It is possible to ensure a sufficiently wide band width also for the purpose of an internal bus for a digital copying machine and interfaces for extension units. It is also possible to easily construct a high-speed digital copying machine system on condition that digital copying machines are connected to each other via a bridge to allow these digital copying machines to perform a parallel operation.

Cost: the need for an expensive dedicated parallel bus mechanism that has been used for each connection between units of a digital copying machine can be eliminated. Further, the need for development or maintenance of the interface for any types of input or output of data such as images, control signals, commands, status information and so forth to or from the digital copying machine can be eliminated. A serial bus such as the IEEE 1394 bus and the USB are utilized not only in a copying machine but also in wide fields of industry. Therefore, a controller LSI forming a bus and a member of a cable are comparatively low cost. Since a unit with low power consumption can be fed with power from a bus, the need for an additional power cable and a circuit is eliminated. Further, it is possible to simultaneously use, using a single cable, two transfer modes: an asynchronous transfer mode in which the communication quality is insured and an isochronous transfer mode in which the communication band is insured. Thus, the need for preparing a discrete interface/bus for each communication can be eliminated.

Maintenance: by using a hot swap as a characteristic of the IEEE 1394 bus and the USB and also using a dynamic auto setting function of the bus, maintenance of these can be performed without shutdown of power for the whole digital copying machine (during operation). In addition, it is possible to realize such a digital copying machine that setting is reconstructed on an autonomous basis without performance of particular settings by an operator. Further, extension of option units and replacement of a faulty part, or the like can be performed without repetitions of shutting power down and restarting the device. Thus, down time can be suppressed to a minimum. It is also possible to realize such a digital copying machine that an end user can easily carry out works such as extension of option units and alteration of device settings which has been carried out only by an expert such as a serviceman. Further, non-stop copying or printing becomes possible by connecting a plurality of digital copying machines to one another via a bridge and allowing, when one of the digital copying machines in operation goes down for some reason, any other digital copying machine connected to the bridge to operate.

Flexibility: since a smaller number of signal lines (four lines, which is easy to manage cables) and restriction to wiring is not strict, the degree of setting flexibility can be increased. Further, only a smaller number of connectors is required, which is advantageous for a layout of terminals for extension units. When a POF (plastic optical fiber) or the like is used for the purpose of noise control, the smaller number of signal lines is more advantageous. Both of the IEEE 1394 bus and the USB allow a tree-structure bus topology, thus a flexible bus structure is possible. When a bus is to be extended, the bus is sprit or extended from the nearest node, therefore, the higher degree of flexibility can be achieved. It is also easy to prepare an extension terminal at an arbitrary location. Further, it is possible to concurrently use, using a single cable, the two transfer modes: the asynchronous transfer mode in which the communication quality is insured and the isochronous transfer mode in which the communication band is insured. Thus, a flexible protocol can be designed appropriately for any communication purpose.

Safety: a bridge is used for connection between a digital copying machine and an external device. Therefore, the digital data inside the digital copying machine can be hidden from the external device. Based on this configuration, even when a highly secret document is copied, it is possible to prevent leakage of the digital data to the external device, thus a high level of data security can be retained.

The present invention is not limited to the embodiments, but is to be construed as embodying all modifications and alternative constructions that may occur to one skilled in the art which fairly fall within the basic teaching herein set forth.

According to one aspect of this invention, the high performance serial interface is used as an inner interface for the digital copying machine, therefore, it is possible to construct a system with a high degree of flexibility.

Further, the drawing control unit and the main control unit are connected to each other by the high performance serial interface. Therefore, in addition to the above explained effect due to the invention, it is possible to increase a transfer clock rate between the drawing control unit and the main control unit.

Further, the scanner control unit and the main control unit are connected to each other by the high performance serial interface. Therefore, in addition to the above explained effect due to the invention, it is possible to make longer a signal line (cable) between the scanner control unit and the main control unit. Thus, it is possible to increase flexibility in arrangement of the scanner control unit and the main control unit.

Further, the scanner control unit and the drawing control unit are connected to the main control unit by their respective high performance serial interfaces. Therefore, in addition to the above explained effect due to the invention, it is possible to increase a transfer clock rate between the drawing control unit and the main control unit, and also make longer a signal line (cable) between the scanner control unit and the main control unit. Thus, it is possible to increase flexibility in arrangement of the scanner control unit and the main control unit.

Further, the image processing unit is connected to the machine by the high performance serial interface. Therefore, in addition to the above explained effect due to the invention, it is possible to construct the system with a higher degree of flexibility.

Further, the panel control unit is further connected to the machine by the high performance serial interface. Therefore, in addition to the above explained effect due to the invention, it is possible to construct the system with a higher degree of flexibility.

According to another aspect of this invention, the high performance serial interface is used as an inner interface, and the main control unit and the drawing control units, each of which is provided for each color, are connected by their respective high performance serial interfaces. Therefore, it is possible to construct the system with a high degree of flexibility.

Further, an option unit is connected to the machine by the high performance serial interface. Therefore, in addition to the above explained effect due to the invention, the option unit can easily be connected to the machine.

Further, the option unit is at least one among a sorter unit, a paper tray unit, an ADF unit, a manual feeder unit, an auto page-turning unit, a charging unit, a bill recognition unit, an OCR unit, a remote diagnosis unit, a filing unit, a facsimile unit, a printer unit, a hard disk drive unit, a removal disk unit, and a paper turning-over unit. Therefore, in addition to the above explained effect due to the invention, the various types of option unit can easily be connected to the machine.

Further, the option units are serially connected to the machine by the same type of high performance serial interfaces. Therefore, in addition to the above explained effect due to the invention, high performance serial interfaces can be unified into one type.

Further, any control unit other than the option units controls the high performance serial interfaces. Therefore, in addition to the above explained effect due to the invention, the high performance serial interfaces can easily be controlled.

Further, there are the isochronous transfer mode and the asynchronous transfer mode as a data transfer mode. Image data is transferred in the isochronous transfer mode, whereas a command is transferred in the asynchronous transfer mode. Therefore, in addition to the above explained effect due to the invention, the serial interfaces can efficiently be utilized.

Further, the IEEE 1394 bus is used as the high performance serial interface. Therefore, in addition to the above explained effect due to the invention, the IEEE 1394-compatible system can be constructed.

Further, the USB is used as the high performance serial interface. Therefore, in addition to the above explained effect due to the invention, the USB-compatible system can be constructed.

Further, the main control unit is determined as a bus manager for the high performance serial interfaces. Therefore, in addition to the above explained effect due to the invention, the need for arbitration between the main control unit and the bus manager is eliminated. Thus, the high performance serial interfaces can efficiently be controlled.

Further, the main control unit is determined as a controller for the high performance serial interfaces. Therefore, in addition to the above explained effect due to the invention, the need for arbitration between the main control unit and the bus manager is eliminated. Thus, the high performance serial interfaces can efficiently be controlled.

Further, the digital copying machine is connected to an external device via the high performance serial interface and the bridge. Therefore, the digital data inside the digital copying machine can be hidden from the external device. Thus, a high level of data security can be achieved.

According to still another aspect of this invention, at least two of the above explained digital copying machines are connected to each other by the bridge via the high performance serial interfaces of the machines, and the bridge is configured so as to allow at least two digital copying machines, which are connected to each other by the bridge, to perform a parallel operation. Therefore, in addition to the above explained effect due to the invention, even when one of the digital copying machines in operation goes down, the other digital copying machine connected to the bridge can be operated. Thus, non-stop copying or printing becomes possible.

According to still another aspect of this invention, at least two of the above explained digital copying machines are connected to each other by the bridge via the high performance serial interfaces of the machines, and the bridge is configured so as to allow, when one of the digital copying machines in operation goes down due to a breakdown or a paper jam or the like, the digital data of the disabled digital copying machine to be transferred to the other digital copying machine that is also connected to the bridge. Therefore, in addition to the above explained effect due to the invention, when one of the digital copying machines in operation goes down due to a breakdown or a paper jam or the like, the digital data of the disabled digital copying machine can be transferred to the other digital copying machine that is also connected to the bridge. Thus, jobs can be allocated to appropriate machines, which allows a user-friendly system to be constructed.

Further, the high performance serial interface is used as an external interface for the bridge. Therefore, in addition to the above explained effect due to the invention, the job itself can also utilize the function of Plug & Play.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed:

1. A digital copying machine comprising:
   a scanner control unit configured to control reading an image of a document;
   a drawing control unit configured to control drawing an image onto an image carrier; and
   a main control unit which controls the overall digital copying machine,
   wherein at least one high performance internal serial interface is operably connected inside the digital copying machine to the main control unit and at least one of the scanner control unit and the drawing control unit that are also inside the digital copying machine.

2. The digital copying machine according to claim 1, wherein said drawing control unit and said main control unit are operably connected to each other by the at least one high performance internal serial interface.

3. The digital copying machine according to claim 1, wherein said scanner control unit and said main control unit are operably connected to each other by the at least one high performance internal serial interface.

4. The digital copying machine according to claim 1, wherein both said scanner control unit and said drawing control unit are operably connected to said main control unit by individual high performance internal serial interfaces.

5. The digital copying machine according to claim 1 further comprising an image processing unit which performs digital image processing relative to an image being scanned by the scanner control unit,
   wherein said image processing unit is operably connected within said digital copying machine by an image processing high performance serial interface.

6. The digital copying machine according to claim 1 further comprising a panel control unit with which a user gives an instruction for an operation,
   wherein said panel control unit is connected to said digital copying machine by a panel control high performance serial interface.

7. The digital copying machine according to claim 1, wherein an option unit is connected to said digital copying machine by an optional high performance serial interface.

8. The digital copying machine according to claim 7, wherein said option unit is at least one among a sorter unit, a paper tray unit, an ADF unit, a manual feeder unit, an auto page-turning unit, a charging unit, a bill recognition unit, an OCR unit, a remote diagnosis unit, a filing unit, a facsimile unit, a printer unit, a hard disk drive unit, a removal disk unit, and a paper turning-over unit.

9. The digital copying machine according to claim 8, wherein all of said option units are connected to said digital copying machine by an individual optional high performance serial interface.

10. The digital copying machine according to claim 9, wherein any of said control units other than said option units controls said individual optional high performance serial interfaces.

11. The digital copying machine according to claim 1 having an isochronous transfer mode and an asynchronous transfer mode as a data transfer mode,
    wherein image data is transferred in the isochronous transfer mode and command(s) is transferred in the asynchronous transfer mode.

12. The digital copying machine according to claim 1, wherein an IEEE 1394 bus is used as said at least one high performance internal serial interface.

13. The digital copying machine according to claim 1, wherein a USB is used as said at least one high performance internal serial interface.

14. The digital copying machine according to claim 12, wherein said main control unit functions as a bus manager for a plurality of high performance serial interfaces.

15. The digital copying machine according to claim 13, wherein said main control unit functions as a controller for a plurality of high performance serial interfaces.

16. The digital copying machine according to claim 1, wherein said digital copying machine is connected to an external device via a device high performance serial interface and a bridge.

17. A digital copying machine comprising:
    a scanner control unit which reads an image of a color document;
    plural drawing control units, each one of the plural drawing control units being respectively provided for each color in order to draw an image onto a latent image carrier in each color; and
    a main control unit which controls the overall digital copying machine,
    wherein a at least one high performance internal serial interface is operably connected inside the digital copying machine to the main control unit and the scanner control unit that is also inside the digital copying machine, and
    said main control unit and said plural drawing control units, respectively provided for each color, are connected together by high performance drawing unit serial interfaces.

18. The digital copying machine according to claim 17, wherein an option unit is connected to said digital copying machine by a an optional high performance serial interface.

19. The digital copying machine according to claim 18, wherein said option unit is at least one among a sorter unit, a paper tray unit, an ADF unit, a manual feeder unit, an auto page-turning unit, a charging unit, a bill recognition unit, an OCR unit, a remote diagnosis unit, a filing unit, a facsimile unit, a printer unit, a hard disk drive unit, a removal disk unit, and a paper turning-over unit.

20. The digital copying machine according to claim 19, wherein all of said option units are connected to said digital copying machine by an individual optional high performance serial interface.

21. The digital copying machine according to claim 20, wherein any of said control units other than said option units controls said individual optional high performance serial interfaces.

22. The digital copying machine according to claim 17 having an isochronous transfer mode and an asynchronous transfer mode as a data transfer mode,
wherein image data is transferred in the isochronous transfer mode and command(s) is transferred in the asynchronous transfer mode.

23. The digital copying machine according to claim 17, wherein an IEEE 1394 bus is used as said at least one high performance internal serial interface and as said high performance drawing unit serial interfaces.

24. The digital copying machine according to claim 17, wherein a USB is used as said at least one high performance internal serial interface and as said high performance drawing unit serial interfaces.

25. The digital copying machine according to claim 23, wherein said main control unit functions as a bus manager for all of said high performance IEEE 1394 bus serial interfaces.

26. The digital copying machine according to claim 24, wherein said main control unit functions as a controller for all of said high performance USB serial interfaces.

27. The digital copying machine according to claim 17, wherein said digital copying machine is connected to an external device via a device high performance serial interface and a bridge.

28. A digital copying machine comprising:
at least two digital copying machines; each of the digital copying machines including, a scanner control unit which reads an image of a document; a drawing control unit which draw an image onto an image carrier; and a main control unit which controls the overall machine, wherein a at least one high performance internal serial interface is operably connected inside each digital copying machine to the main control unit and at least one of the scanner control unit and the drawing control unit,
wherein said digital copying machines are connected to each other by a bridge cooperating with the high performance serial interfaces of the digital copying machines, and
said bridge and cooperating high performance serial interfaces are configured so as to allow said digital copying machines to perform a parallel operation.

29. The digital copying machine system according to claim 28, wherein a high performance bridge serial interface is used as an external interface for said bridge.

30. A digital copying machine system comprising:
at least two digital copying machines; each of the digital copying machines including a scanner control unit which reads an image of a color document; plural drawing control units each one of the plural drawing control units being respectively provided for each color in order to draw an image onto a latent image carrier in each color; and a main control unit which controls each overall digital copying machine, wherein a at least one high performance serial interface is used as an interface associated with each main control unit, and said main control unit and said drawing control units, each of which is provided for each color, are connected together by high performance drawing unit serial interfaces,
wherein said digital copying machines are connected to each other by a bridge cooperating with the high performance serial interfaces of the digital copying machines, and
said bridge and cooperating high performance serial interfaces are configured so as to allow said digital copying machines to perform a parallel operation.

31. The digital copying machine system according to claim 30, wherein a high performance bridge serial interface is used as an external interface for said bridge.

32. A digital copying machine system comprising:
a least two digital copying machines; each of the digital copying machines including, a scanner control unit which reads an image of a document; a drawing control unit which draws an image onto an image carrier; a main control unit, and a high performance serial interface is used as an internal interface operably connected to the main control unit and at least one of the scanner control unit and the drawing control unit,
said bridge and cooperating high performance serial interfaces are configured so as to allow, when one of the digital copying machines in operation becomes disabled, the digital data of said disabled digital copying machine to be transferred to the other digital copying machine connected to said bridge.

33. The digital copying machine system according to claim 32, wherein a high performance serial interface is as an external interface for said bridge.

34. A digital copying machine system comprising:
at least two digital copying machines; each of the digital copying machines including, a scanner control unit which reads an image of a color document; plural drawing control units individually provided for a different component color needed to draw an image onto a latent image carrier in each different component color; and a main control unit which controls each overall digital copying machine, wherein a high performance serial interface is used as an internal interface, and said main control unit and said drawing control units, each of which is provided for each different component color, are connected together by high performance drawing unit serial interfaces, wherein said digital copying machines are connected to each other by a bridge cooperating with the high performance serial interfaces of the digital copying machines, and
said bridge and cooperating high performance serial interfaces are configured so as to allow, when one of the digital copying machines in operation becomes disabled, the digital data of said disabled digital copying machine to be transferred to the other digital copying machine connected to said bridge.

35. A digital copying machine comprising:
an internal scanner control unit configured to control reading an image of a document;
an internal drawing control unit configured to control drawing an image onto an image carrier; and
a main control unit inside the housing configured to control at least one of the internal scanner control unit and the internal drawing control unit, via at least one high performance internal serial interface connected to the main control unit and the at least one of the internal scanner control unit and the internal drawing control unit.

* * * * *